Sept. 28, 1943.   E. S. McCOLL   2,330,508
SYSTEM FOR REMOVING OIL FILMS FROM BODIES OF WATER
Filed March 5, 1940   2 Sheets-Sheet 1
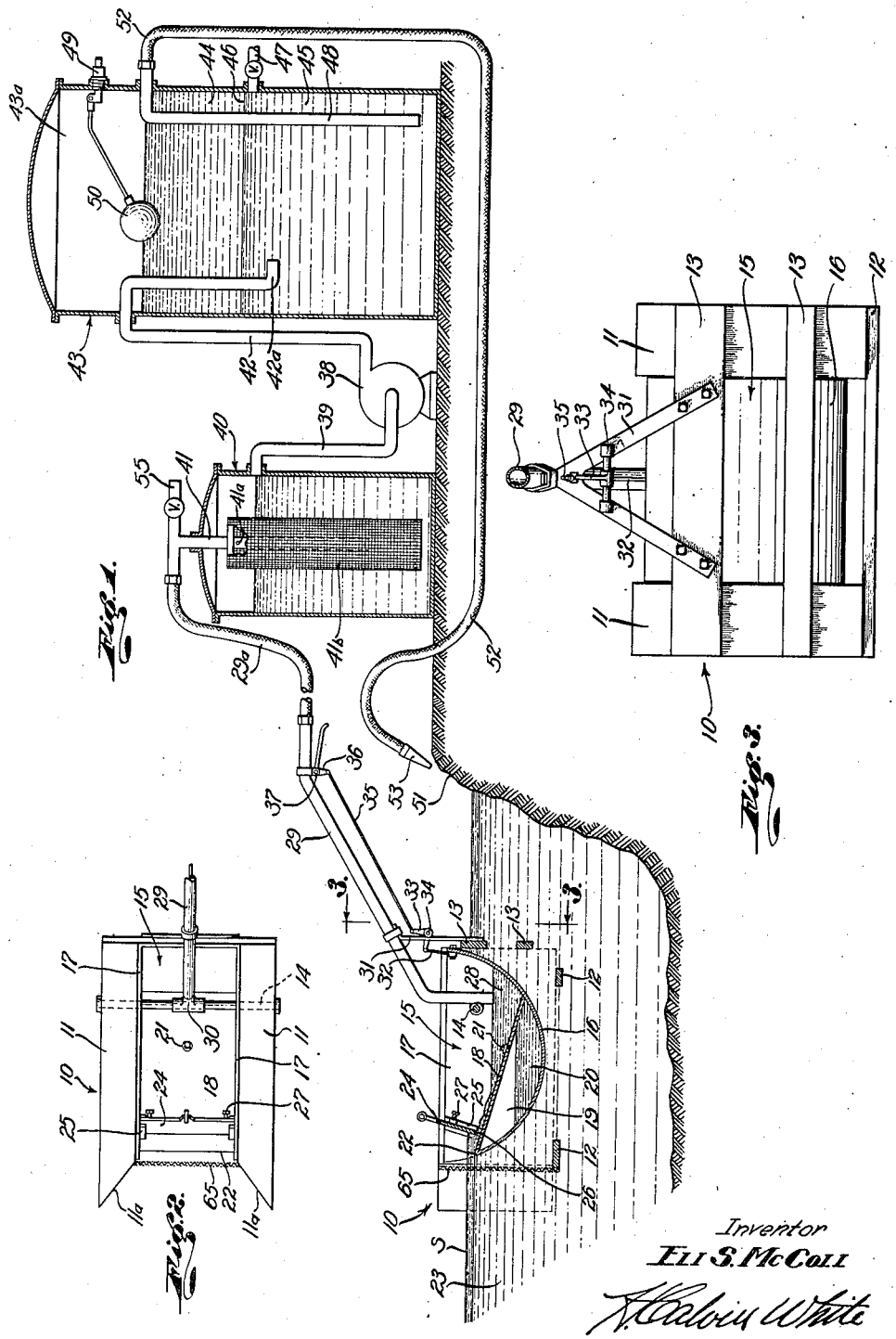
Inventor
ELI S. McCOLL
F. Calvin White
Attorney

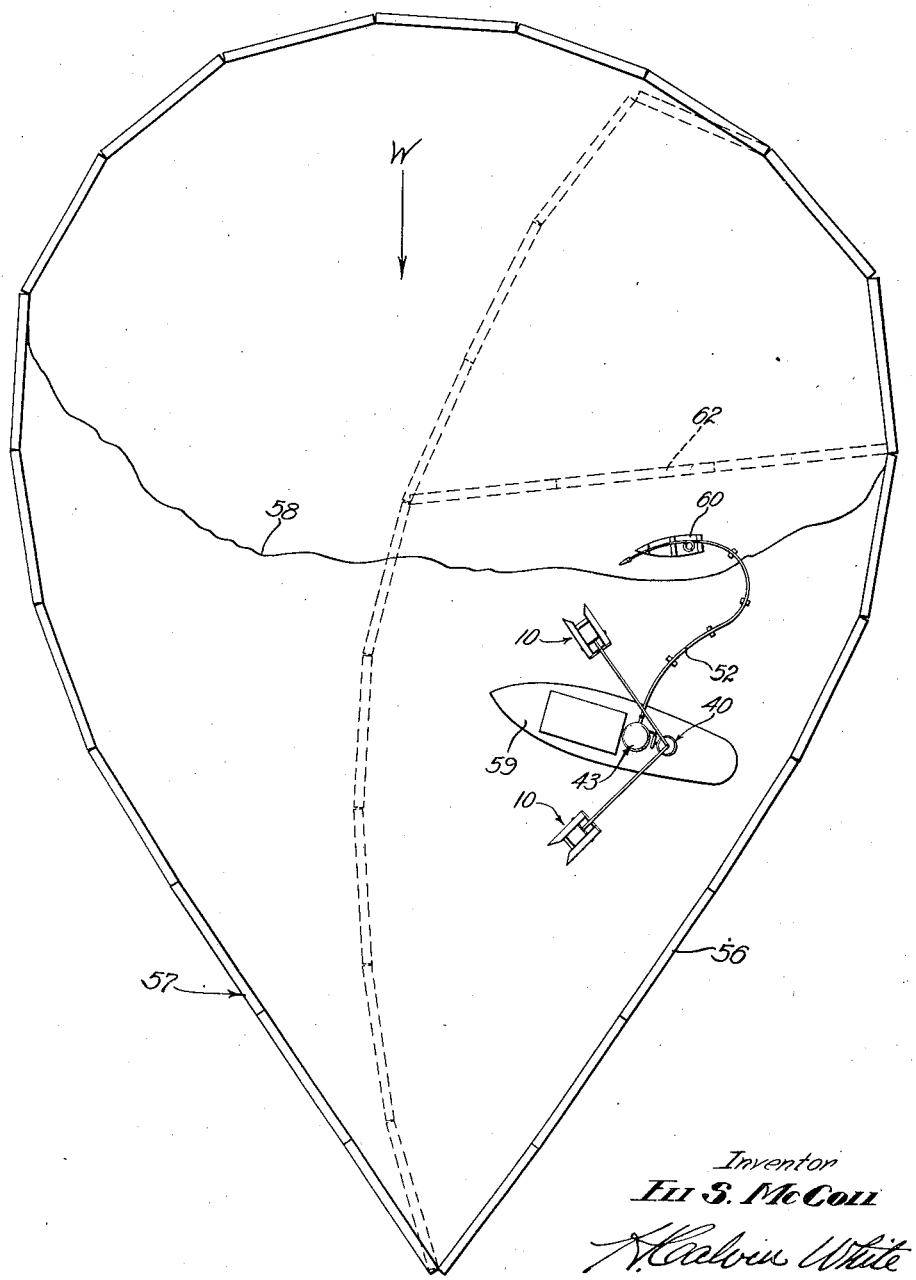

Patented Sept. 28, 1943

2,330,508

UNITED STATES PATENT OFFICE 2,330,508

SYSTEM FOR REMOVING OIL FILMS FROM BODIES OF WATER

Eli S. McColl, Long Beach, Calif.

Application March 5, 1940, Serial No. 322,304

5 Claims. (Cl. 210—44)

This invention has to do with an improved system for the removal of oil films from bodies of water such as ponds, sumps, or larger bodies including lakes and ocean harbors, and has for its general and primary object to obviate a great part of the difficulties and expense of removing the oil, that have been characteristic of past practices.

It frequently happens that in the vicinity of oil producing or refining operations, substantial quantities of oil will collect in washes or streams under various circumstances, giving rise to a serious condition and problem by reason of oil pollution of the streams and larger bodies of water into which they flow. Insofar as I am aware, there have been available no desirably economical and expeditious systems for removing the oil from the water. One commonly used method has been to spread straw on the oil surfaces, causing the oil to adhere to the straw, and then to gather and burn or otherwise dispose of the straw. In addition to its many apparent disadvantages, the principal objection to this practice is the relatively great amount of time, labor and expense involved, and the inconvenience and necessity oftentimes for making available a large crew of men for such clean up work.

The invention provides a system whereby oil film or other scum may be removed from the surface of the water as well as, to a considerable extent, from the bank or other edge of the water, by a simple method requiring only comparatively little labor and inexpensive equipment. In accordance with the method contemplated by the invention, the oil film is removed from the water by the application of a suction device in a manner such as to cause continuous withdrawal of the oil and creation of an induced flow of remaining oil film toward the point of removal. In this manner it is possible to rapidly remove the oil film in any relatively small area, and as will later appear, to follow and remove the remaining film to any extent and in any direction so that the entire film may be removed easily and in relatively short time.

Preferably, the suction device to which I have referred comprises a floating structure connected to a suction conduit and provided with means whereby the application of suction operates to withdraw and remove the oil film from the surface of the water. This suction device may desirably have adjustable characteristics in that the depth of the film or surface layer of the liquid being removed, may be controllably varied as desired. According to a preferred form of the invention, this result and type of operation is accomplished by providing the floating suction device with an adjustable overflow edge positioned a determined distance below the surface of the oil film, and over which the oil film, together with some water, flows into a space or chamber below the surface of the body of water. In this manner I am able, in effect, to skim the surface of the water to a limited depth and to cause gravity flow of the oil into a submerged chamber from which the oil and water mixture may be withdrawn through the suction conduit.

As previously indicated, by using a floating suction device of this character, it is possible to follow the oil film over any area, and consequently to apply the system to removal of oil film from large bodies of water such as harbors and the like. In such instances, the invention contemplates certain additional features which, in conjunction with suction removal of the oil film, enable the film initially to be confined within a given operating area, and then to become progressively confined within more limited areas as the oil film is progressively removed. As will later appear, this feature is accomplished by first placing a movable enclosure, such as a log boom, about the film area, and then working and confining the oil film toward and within smaller areas as the film continues to be removed.

As a further or independent aid in working the oil film to a particular location at which it is being removed, the outer portion of the film may be flushed by a high velocity stream of water toward that location. This same use of a flushing stream may be employed for the purpose of dislodging and working out into the body of water, oil that may have collected at or on a bank or boom at the edge of the water, all as will hereinafter more fully appear.

Although any suitable disposal may be made of the water and oil mixture withdrawn from the floating structure through the suction conduit, I prefer to separate the removed oil and water for whatever value the oil may have and to prevent further contamination of surface water by this oil, and also to enable the separated water to be used wherever desirable as a means for flushing the oil film toward the point of removal from the water, as previously explained. While in many instances, it may be preferable to employ an independent stream of water for flushing the film, use of the water separated from the oil for that purpose is particularly convenient by reason of the available pressure by use of a single pump employed to create the suction employed in removing the oil film.

The features and object of the invention discussed in the foregoing, as well as various additional details, will be understood to better advantage from the following description of the invention as embodied in a typical and illustrative form. Throughout the description reference is had to the accompanying drawings in which:

Fig. 1 is a general view of the system showing the floating suction apparatus and separating tanks in vertical section;

Fig. 2 is a plan view of the suction apparatus;

Fig. 3 is an end elevation of the suction apparatus as viewed from the right; and Fig. 4 is a diagrammatical view illustrating the use of the present method as applied to the removal of oil film within a confined area of a body of water.

Referring first to Fig. 1, the typical form of suction apparatus generally indicated at 10 comprises a pair of vertically extending floats 11 suitably interconnected at their bottoms by cross members 12 and across one end by members 13. These floats 11 may be of any desired form and construction that may be suitably weighted to the proper depth of submergence below the oil film surface S. Typically they may consist of hollow shells or pontoons made of sufficiently heavy metal plate to submerge to substantially the depth illustrated. The forward ends of the floats 11 may be beveled as at 11a to facilitate access of the oil film to the space between the floats.

The floats also are interconnected by a rod 14 on which is pivotally mounted a chamber or shell 15 having a curved bottom 16 and vertically extending sides 17 through which the rod 14 extends. An inclined plate 18 encloses within the bottom of chamber 15 a ballast compartment 19 which contains a suitable material, preferably liquid 20 introduced through a plugged opening 21, that weights the chamber assembly 15 sufficiently to facilitate adjustment of the forward overflow edge 22 of the chamber, as will presently appear. The use of liquid 20, such as water or oil, to weight the chamber is preferred by reason of the capacity of the liquid for shifting with compartment 19 and thereby maintaining the chamber 15 in proper balance as it is pivotally swung about rod 14.

The overflow edge 22 at the forward end of compartment 19 is adapted to be submerged, substantially as illustrated, a proper distance below the oil surface S to skim the oil film and permit the latter, together with some water below the film, to overflow on the top surface of plate 18 into the chamber 15. A screen 65 is placed across the mouth of the apparatus to prevent any large pieces of debris or the like from entering the overflow chamber. In order to prevent an excessive rate of liquid flow into the chamber, as might occur when the water 23 is rough, I place between the side walls 17 of the chamber a suitable weir 24 confined between guides 25 and having limited clearance at 26 from the surface of plate 18. The weir 24 is adjustable within the guides to vary that clearance and is releasably held in adjusted position by set screws 27. The particular position to which the wier is adjusted preferably will permit an in-flow of liquid corresponding substantially to the rate at which it is being withdrawn from chamber 15 by pump 38.

Oil and water overflowing the edge 22 into chamber 15 collects in a body 28 from which the mixture is withdrawn through a suitable suction conduit 29 shown typically in the form of a pipe supported on rod 14 by a clamp 30 and on cross member 13 by a bracket 31, see Fig. 3. Suitable mechanism, preferably of a remote control type in the sense that it is operable at a location some distance from the suction apparatus 10, is provided for adjustably swinging the chamber 15 about rod 14 and thereby controllably varying the depth of the overflow edge 22 beneath the surface S of the oil film. As a typical control mechanism, I show the rear edge of the chamber to be connected by link 32 with a bell crank 33 pivotally mounted at 34 on bracket 31, and connected by rod 35 with a second bell crank 36 pivotally mounted at 37 on the suction conduit 29. Movement of bell crank 36 in one direction swings chamber 15 about rod 14 to increase the submergence of the overflow edge 22 beneath the oil surface, while operation of the bell crank in an opposite direction brings the edge 22 closer to the oil surface.

Suction is applied to chamber 15 by a suitable pump 38, the inlet line 39 of which is connected through a closed tank 40 with pipe 41 and a flexible pipe or hose 29a connected to the conduit 29. The oil and water mixture in body 28 is drawn together with some air, through conduit 29, hose 29a and pipe 41 into a filter 41b in the form of a closed tubular screen within tank 40, the screen serving to remove solid particles of dirt from the fluid stream in advance of the pump. A vent opening 41a in pipe 41 above the liquid level in the tank permits air to escape directly to the outlet pipe 39. The oil, water and air mixture is discharged by pump 38 through line 42 into a closed pressure tank 43 wherein stratification of the oil and water occurs, as indicated at 44 and 45, and the air separates into the top chamber 43a of the tank. The outlet 42a of pipe 42 preferably terminates some distance below the normal water level 46. Valve V permits the stratified oil 44 to be intermittently or continuously drawn from the tank through valved line 47 when the oil layer drops below the latter, and the water 45 is discharged under pressure through a pipe 48 extending upward from a low depth in the tank.

Provision is made for separating the air from the oil and water and at the same time maintaining sufficient pressure in tank 43 to discharge the water through the outlet line 48 at desirably high velocity, by releasing air from chamber 43 under control of a valve 49 which is operated by float 50 riding the oil surface. As the oil level drops below a predetermined height, valve 49 opens to release air from chamber 43a until the liquid level again rises, due to the reduced pressure, to the normal level at which the float closes the air valve. While any disposal may be made of the water discharged through pipe 48, it may be advantageous in many instances to utilize this water as a flushing stream for removing and washing the oil film toward the suction device 10, and for dislodging oil at the bank 51 or other edge of the body of water. Thus pipe 48 is shown to be connected with a hose 52 from the nozzle 53 of which water is discharged by the maintenance of pressure in tank 43, as explained. It may be mentioned that at the end of operations, nozzle 53 may be closed to prevent siphoning of the liquid from tank 43 through the water outlet pipe and hose.

In the operation of the system, the suction apparatus 10 is floated on the body of water filmed with oil, chamber 15 adjusted to bring the overflow edge 22 to the proper depth below the oil surface S, and the oil film taken into chamber 15 to be withdrawn through the suction conduit, all as previously explained. Continuous flow of the oil film into chamber 15 induces a flow of remaining oil film in the vicinity of the suction apparatus into the chamber, so that the action of the suction apparatus is both continuous and self-operating to draw the oil film toward the point of removal, i. e. the overflow edge 22. The apparatus 10 however may also be moved to follow the oil film over the entire or any portion of the surface of the body of water. At the same time, the oil film may be washed toward the suction apparatus by the flushing action of a stream of water directed against the outer edge of the oil film from hose 52, and this same flushing action may be employed to dislodge and wash toward the suction apparatus, oil tending to remain at the edge of the body of water. It may also be observed that any suitable number of individual suction apparatuses 10 may be used, depending upon the size of the oil film and circumstances under which it is being removed, and that a single pump and tank assembly may accommodate more than one suction apparatus. For example, a second suction apparatus may be connected in the system by attachment to the valved branch 55 of pipe 41.

In Fig. 4 I have illustrated an adaptation of the invention in removing large oil films from bodies of water such as ocean harbors. Initially, a suitably anchored barrier, typically a log boom 56, is placed about the oil film and preferably arranged so that one end of the boom converges as at 57 in the direction toward which the oil film tends to become swept by the prevailing wind. In the drawings, the wind direction is indicated by the arrow W and the edge of the oil film occupying the converged area enclosed by the boom, by line 58. The described tanks 40 and 43, (together with a storage tank, not shown, for the separated oil) may be placed on a boat 59 and one or more of the suction apparatuses 10 floated on the filmed area of the water in sufficient proximity to be controllable by an operator on the boat. The flushing hose 52 may be led off to a second boat 60 beyond the edge 58 of the oil film, and from which an operator directs a stream of water against the film to wash it toward the suction apparatuses.

Continued withdrawal of the oil film progressively reduces its area toward the converged end 57 of the boom. As the film area becomes smaller, it may be desirable to further confine the film as by shifting one side of the boom to the dotted line position 61, and also to further confine the area back of the oil film, as by a cross boom 62. As will be apparent, by this method it is possible to confine the film against spreading or escape regardless of the wind direction, and to progressively remove and further confine the film until it has been completely taken from the water.

It is to be understood that the drawings are merely illustrative of the invention in certain of its typical aspects and forms, and that various changes and modifications may be made without departure from the invention in its intended spirit and scope.

I claim:

1. Apparatus for removing oil film from the surface of a body of water, comprising a structure adapted to float on the water and including walls forming a chamber below the surface of the water, float means supporting said structure, a skimming member carried by said structure below the oil film level and over which a stream of the oil film flows by gravity into said chamber, a weir supported by said structure and positioned above said skimming member in the path of said stream and controlling the rate of said oil flow into the chamber, means mounting said skimming member, weir and chamber walls for pivotal vertical adjustment relative to said float means, and means for removing oil from the chamber.

2. Apparatus for removing oil film from the surface of a body of water, comprising a structure adapted to float on the water, float means supporting said structure on the water, said structure including walls forming a chamber extending from above the surface of the water to a depth below said surface, a skimming member carried by said structure below the oil film and over which the oil film flows by gravity into said chamber, means pivotally mounting said skimming member for vertical swinging adjustment relative to said float means, and means for removing oil from said chamber.

3. Apparatus for removing oil film from the surface of a body of water, comprising a structure adapted to float on the water, float means supporting said structure on the water, said structure including walls forming a chamber extending from above the surface of the water to a depth below said surface, a skimming member formed integrally with the bottom of the chamber and positioned below the oil film so that the oil film flows by gravity over the skimming member into said chamber, means pivotally mounting said skimming member and chamber walls for vertical swinging adjustment relative to said float means, and means for removing oil from said chamber.

4. Apparatus for removing oil film from the surface of a body of water, comprising a structure adapted to float on the water and including a pair of spaced floats, walls forming a chamber between said floats and extending from above the surface of the water to a depth below said surface, said walls including a skimming member over which the oil film flows by gravity into the chamber, means pivotally mounting said chamber walls and skimming member on said floats for vertical swinging adjustment, and means for removing oil from said chamber.

5. Apparatus for removing oil film from the surface of a body of water, comprising a structure adapted to float on the water and including a pair of spaced floats, walls forming a chamber between said floats and extending from above the surface of the water to a depth below said surface, said walls including a skimming member over which the oil film flows by gravity into the chamber, means pivotally mounting said chamber walls and skimming member on said floats for vertical swinging adjustment, an adjustable weir above said skimming member and movable therewith, and means for removing oil from said chamber.

ELI S. McCOLL.